(12) United States Patent  
Lin (10) Patent No.: US 6,220,149 B1
(45) Date of Patent: Apr. 24, 2001

(54) BARBEQUE GRILL STRUCTURE (75) Inventor: Yu-Yuan Lin, Tainan (TW)

(73) Assignee: Uni-Splendor Corp., Tainan (TW)

( * ) Notice: Subject to any disclaimer, the term of this patent is extended or adjusted under 35 U.S.C. 154(b) by 0 days.

(21) Appl. No.: 09/618,040

(22) Filed: Jul. 17, 2000

(51) Int. Cl.$^7$ ............................... A47J 36/26; A47J 37/00
(52) U.S. Cl. ................... 99/339; 99/340; 99/400; 99/446; 99/447; 99/449; 99/450; 126/9 R; 126/25 R; 126/41 R
(58) Field of Search ................ 99/339, 340, 400, 99/401, 444–450, 481, 482, 483; 126/9 R, 25 R, 41 R; 219/400, 401

(56) References Cited

U.S. PATENT DOCUMENTS

| | | | |
|---|---|---|---|
| 2,253,833 | * | 8/1941 | Volks ................................. 99/446 |
| 2,413,204 | * | 12/1946 | Wolff ................................ 99/447 X |
| 3,987,719 | * | 10/1976 | Kian ................................. 99/422 |
| 4,373,511 | * | 2/1983 | Miles et al. ...................... 126/25 R |
| 4,800,865 | * | 1/1989 | Setzer ............................... 99/401 X |
| 4,922,079 | * | 5/1990 | Bowen et al. ..................... 99/400 X |
| 5,097,753 | * | 3/1992 | Bowen et al. ................... 219/401 X |
| 5,107,096 | * | 4/1992 | Knees ............................... 99/450 X |
| 5,313,877 | * | 5/1994 | Holland ............................. 99/447 X |
| 5,351,068 | * | 9/1994 | Muchin ............................. 99/339 X |
| 5,431,091 | * | 7/1995 | Couture ............................. 99/447 X |
| 5,782,165 | * | 7/1998 | Glenboski et al. ................... 99/340 |
| 5,873,300 | * | 2/1999 | Kuhlman ........................... 99/422 X |

* cited by examiner

Primary Examiner—Timothy F. Simone
(74) Attorney, Agent, or Firm—Bacon & Thomas, PLLC (57) ABSTRACT A barbeque grill structure includes a concave base, a grille-shaped framework, and a top cap. The framework defines an opening having two side walls each formed with a support step face. A material box is received in the opening and has two sides each formed with a support piece seated on the support step face. A top cover is removably mounted on the material box and defines a plurality of air vents. In such a manner, a closed chamber is defined between the framework and the top cap, and connects to the material box through the air vents.

4 Claims, 9 Drawing Sheets

BARBEQUE GRILL STRUCTURE

BACKGROUND OF THE INVENTION

1. Field of the Invention

The present invention relates to a barbeque grill structure.

2. Description of the Related Art

Figure 1:
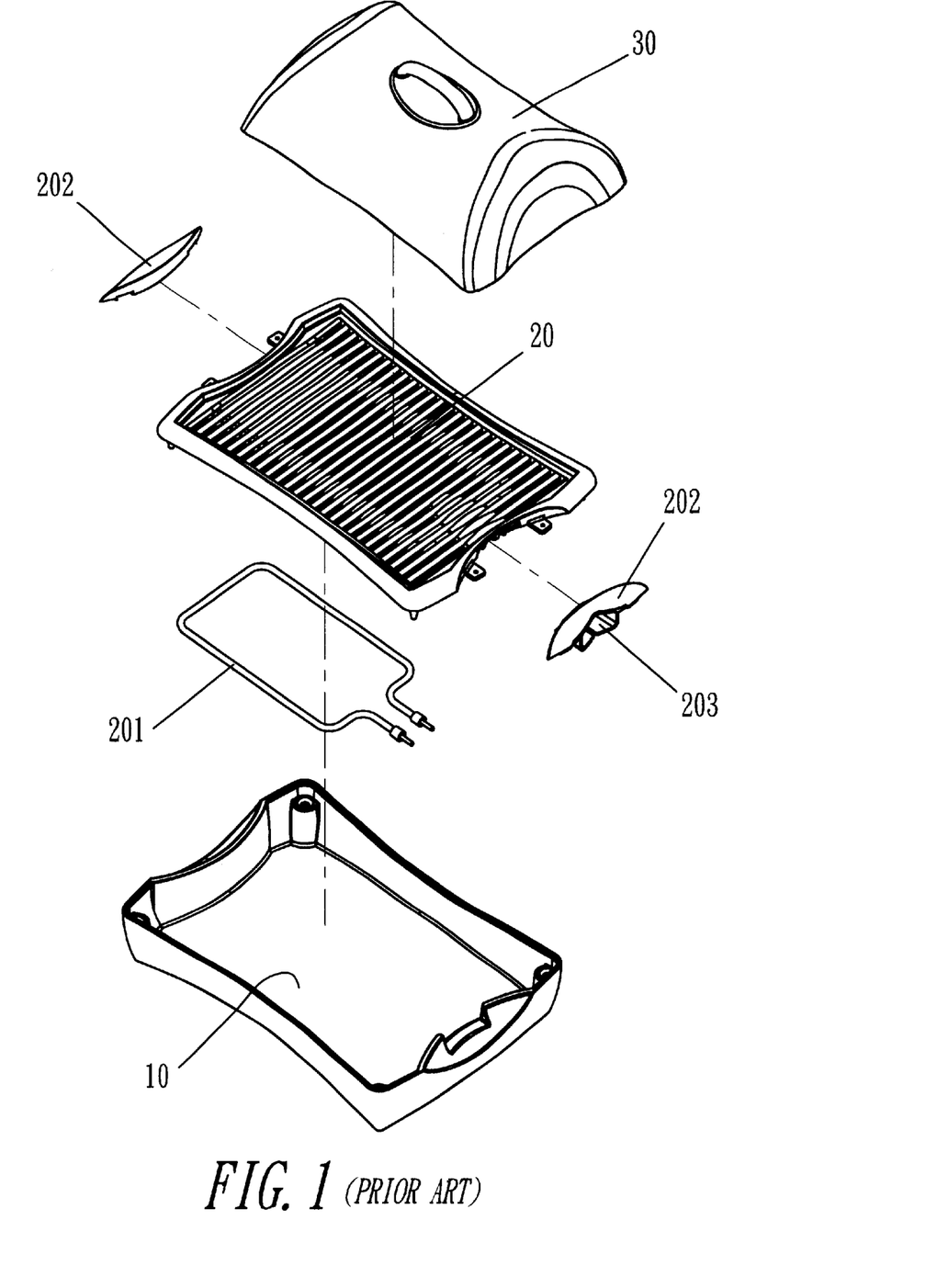
FIG. 1 is an exploded view of a conventional barbeque grill structure in accordance with the prior art.

A conventional barbeque grill structure in accordance with the prior art shown in FIG. 1 comprises a concave base 10, a grille-shaped framework 20 mounted in the base 10, a hollow top cap 30 mounted on the base 10, and a heating tube 201 secured on the bottom of the framework 20 for heating it. The framework 20 has two sides each provided with a handle 202, and the handle 202 on one of the two sides of the framework 20 is provided with a socket 203 in which an electric plug (not shown) can be inserted so as to supply power to the heating tube 201. However, the user has to manually provide different kinds of spices so that the fragrance of the spices can be attached on the surface of the food for seasoning the food, so easily causing inconvenience to the user.

SUMMARY OF THE INVENTION

In accordance with one aspect of the present invention, there is provided a barbeque grill structure comprising: a concave base, a grille-shaped framework, and a top cap, the framework defining an opening having two side walls each formed with a support step face, a material box received in the opening and having two sides each formed with a support piece seated on the support step face, a top cover removably mounted on the material box and defining therein a plurality of air vents, whereby, a closed chamber is defined between the framework and the top cap, and connects to the material box through the air vents.

The barbeque grill structure further comprises an insertion piece removably mounted in the opening of the framework, whereby, when the material box is removed from the opening, the insertion piece is mounted in the opening, thereby forming a complete framework.

The support step face of the opening of the framework defines a first screw hole, the support piece of the material box defines a second screw hole, and the insertion piece has two sides each defining a third screw hole so that the material box or the insertion piece can be locked in the opening.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 2–7, a barbeque grill structure in accordance with the present invention comprises a concave base 1, a grille-shaped framework 2 mounted in the base 1, a protruding hollow top cap 3 mounted on the base 1, and a heating tube 21 secured on the bottom of the framework 2 for heating it.

Figure 2:
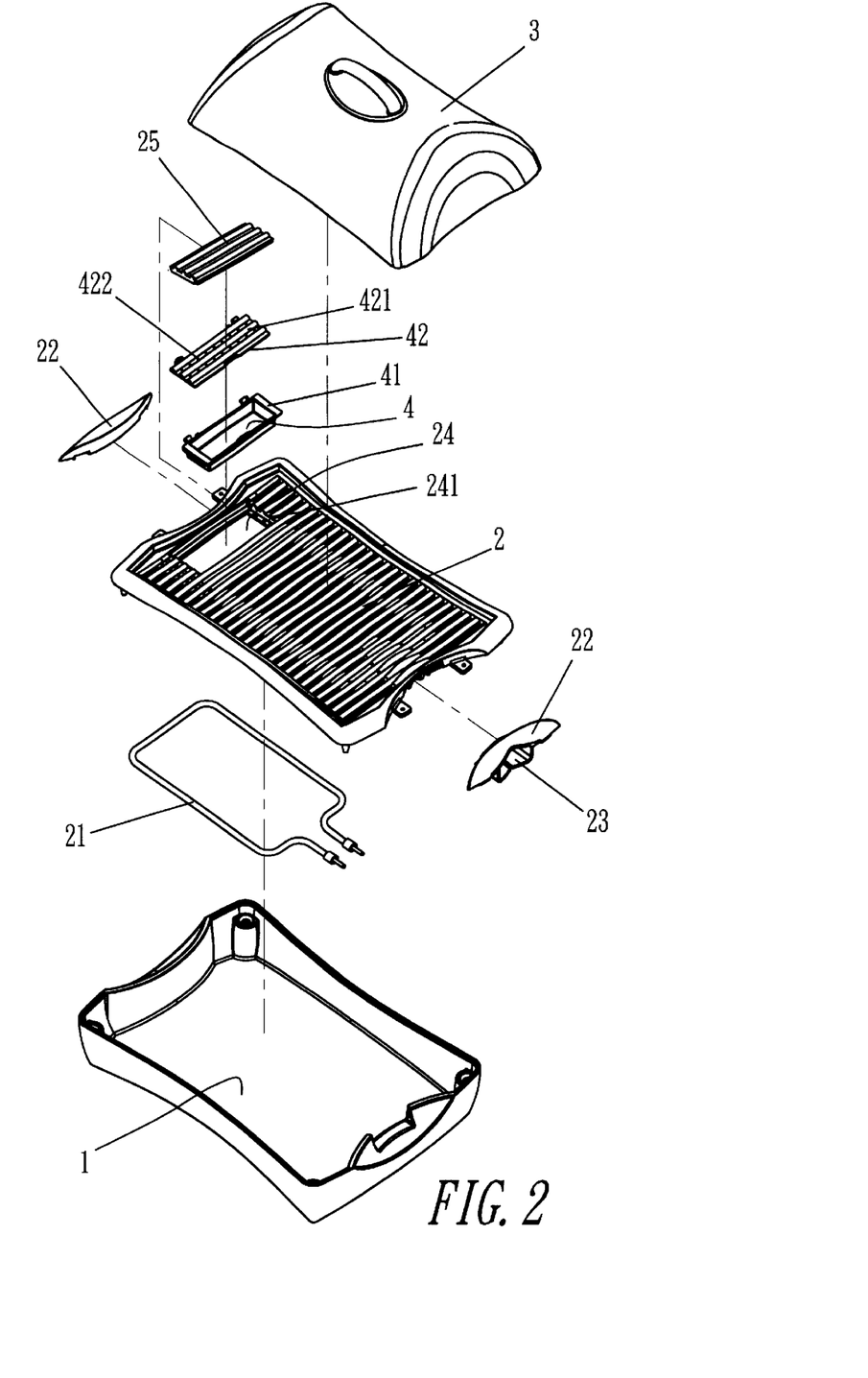
FIG. 2 is an exploded view of a barbeque grill structure in accordance with the present invention.
Figure 3:
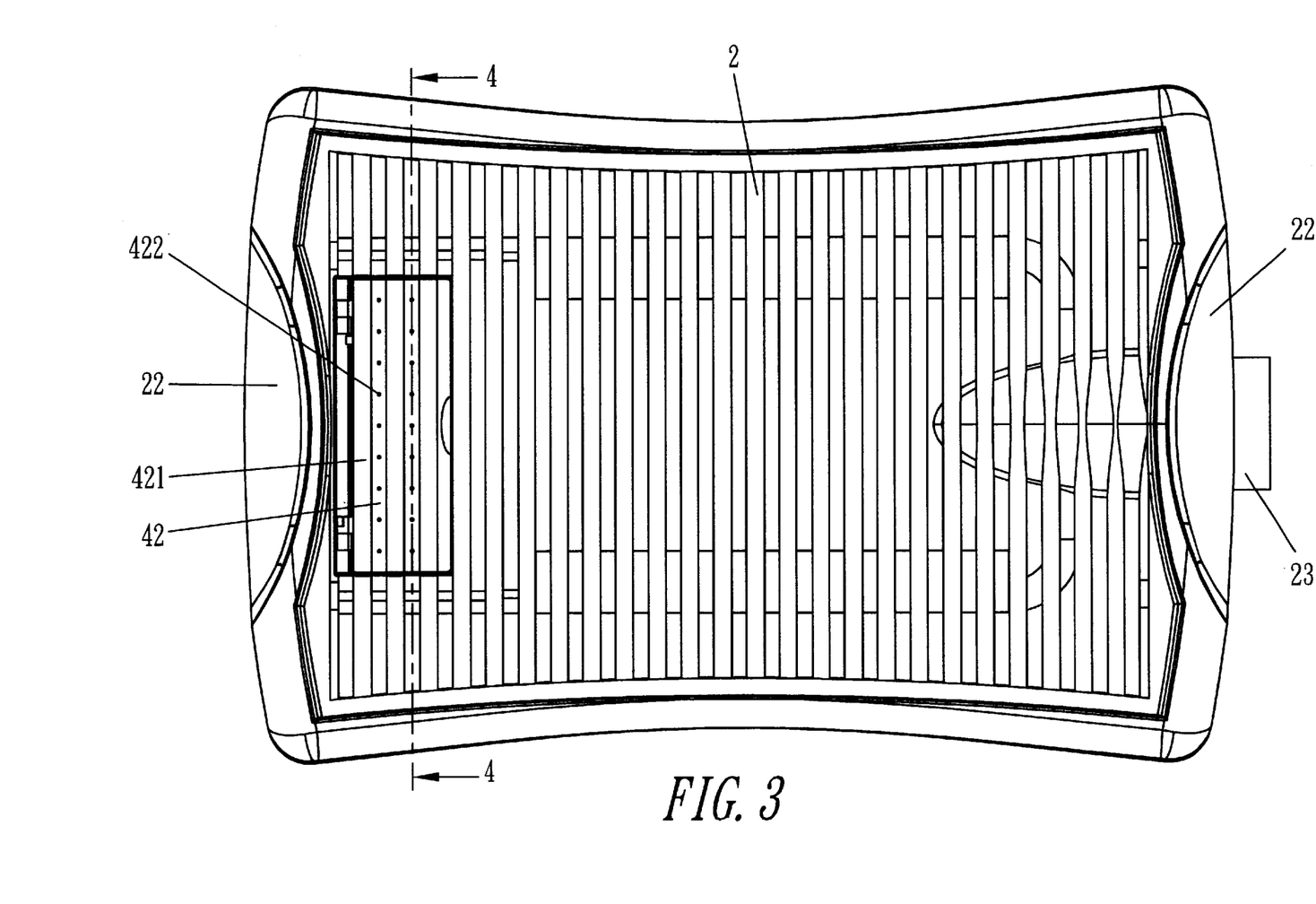
FIG. 3 is a top plan assembly view of the barbeque grill structure as shown in FIG. 2.
Figure 4:
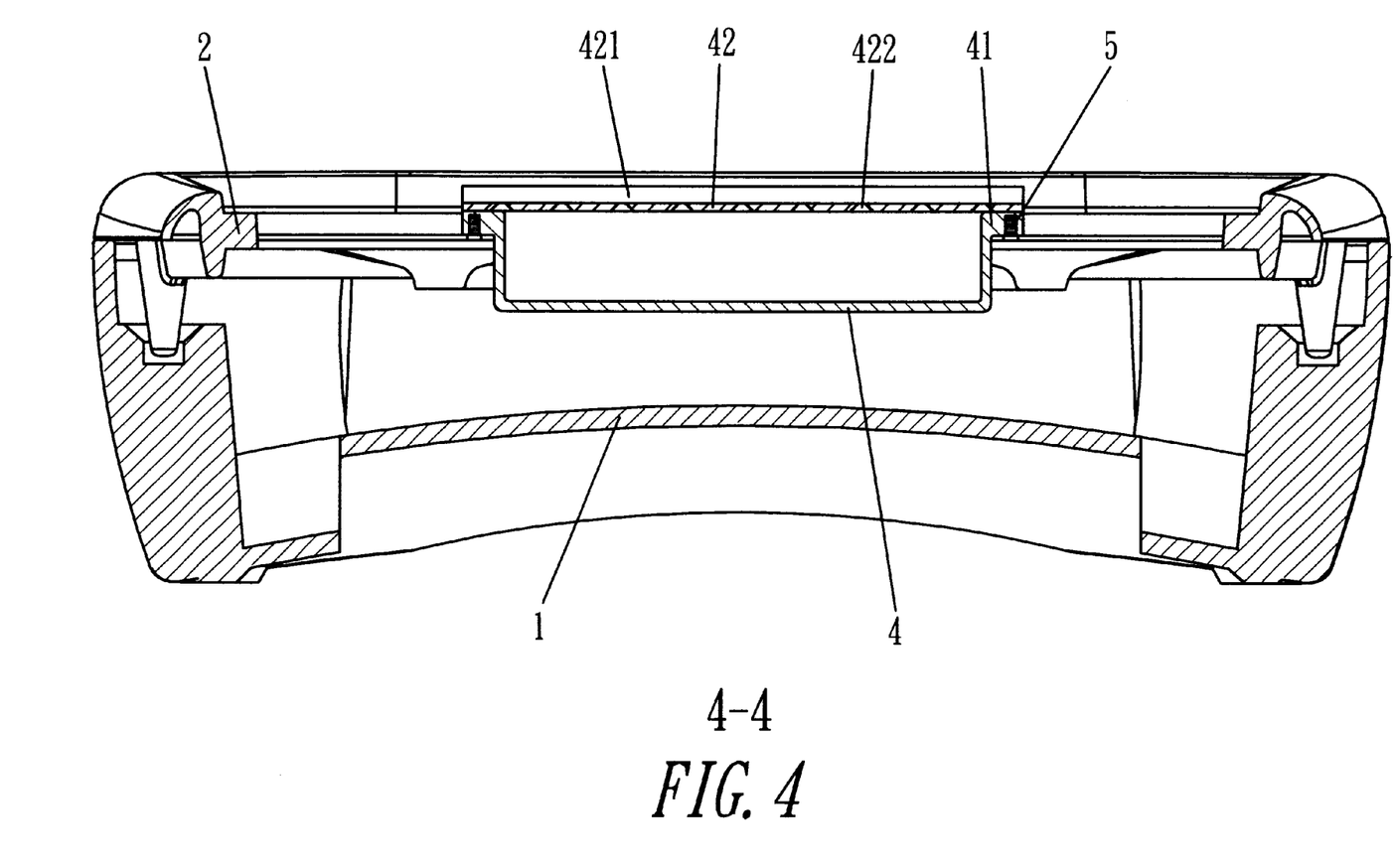
FIG. 4 is a side plan cross-sectional assembly view of the barbeque grill structure as shown in FIG. 2.
Figure 5:
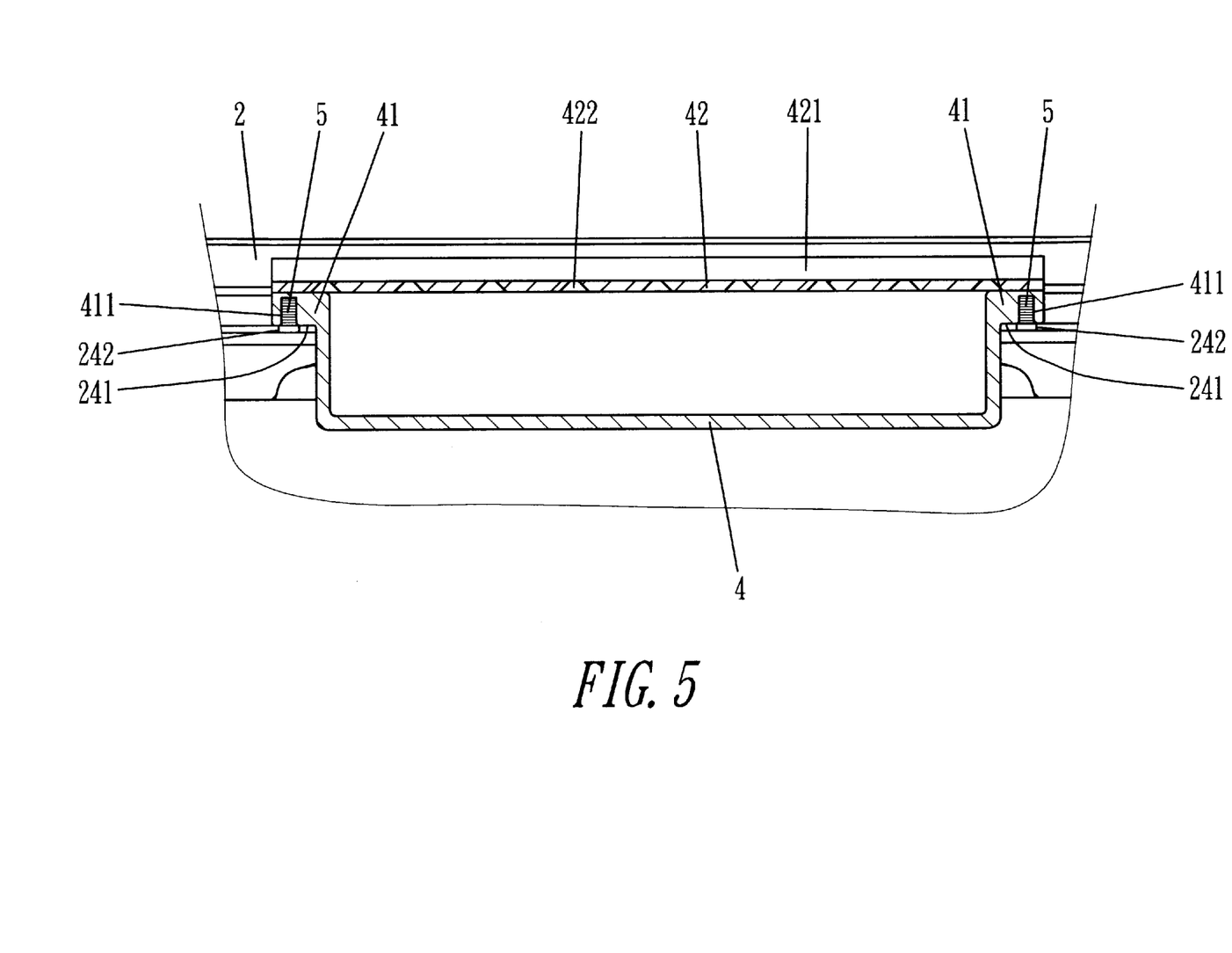
FIG. 5 is an enlarged view of the barbeque grill structure as shown in FIG. 4.

The framework 2 has two sides each provided with a handle 22, and the handle 22 on one of the two sides of the framework 2 is provided with a socket 23 in which an electric plug (not shown) can be inserted so as to supply power to the heating tube 21.

The framework 2 defines an opening 24 having two side walls each formed with a support step face 241. A material box 4 is secured in the opening 24 and has two sides each formed with a support piece 41 seated on the support step face 241. A top cover 42 is removably mounted on the material box 4 and defines therein a plurality of air vents 422. Each of the vent holes 422 has a tapered shape having a smaller top portion and a larger bottom portion. A plurality of protruding ribs 421 are formed on the top cover 42 to mate with the shape of the framework 2. In such a manner, a closed chamber is defined between the framework 2 and the top cap 3, and connects to the material box 4 through the air vents 422 as shown in FIG. 6.

The barbeque grill structure also comprises an insertion piece 25 removably mounted in the opening 24 of the framework 2 and having a shape mating with that of the framework 2. In such a manner, when the material box 4 is removed from the opening 24, the insertion piece 25 can be mounted in the opening 24, thereby completing the framework 2.

The support step face 241 of the opening 24 of the framework 2 defines a first screw hole 242 (see FIG. 5), the support piece 41 of the material box 4 defines a second screw hole 411 (see FIG. 5), and the insertion piece 25 has two sides each defining a third screw hole 251 (see FIG. 9) so that the material box 4 or the insertion piece 25 can be locked in the opening 24 by a locking bolt 5.

Figure 6:
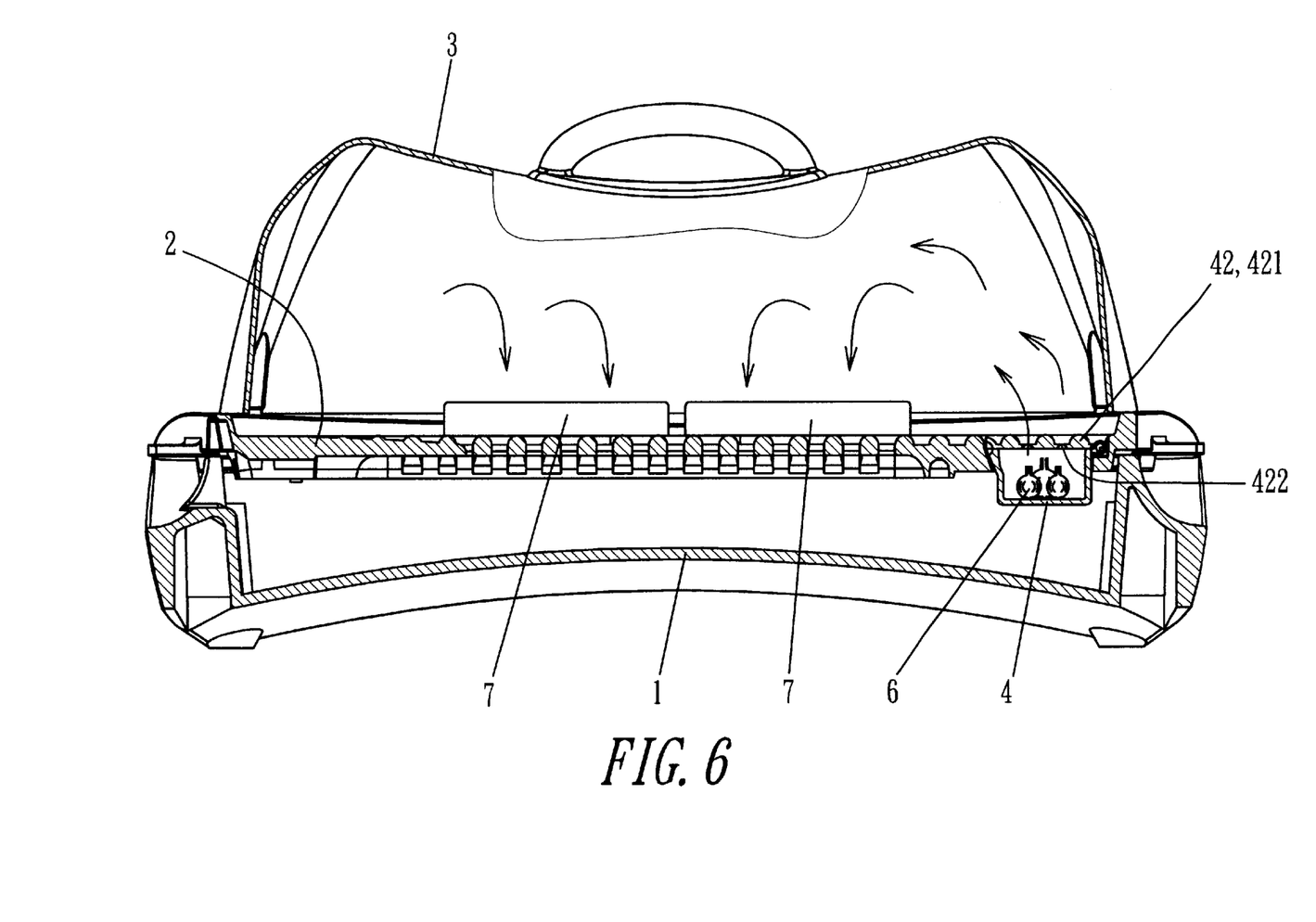
FIG. 6 is a front plan cross-sectional assembly view of the barbeque grill structure as shown in FIG. 2.
Figure 7:
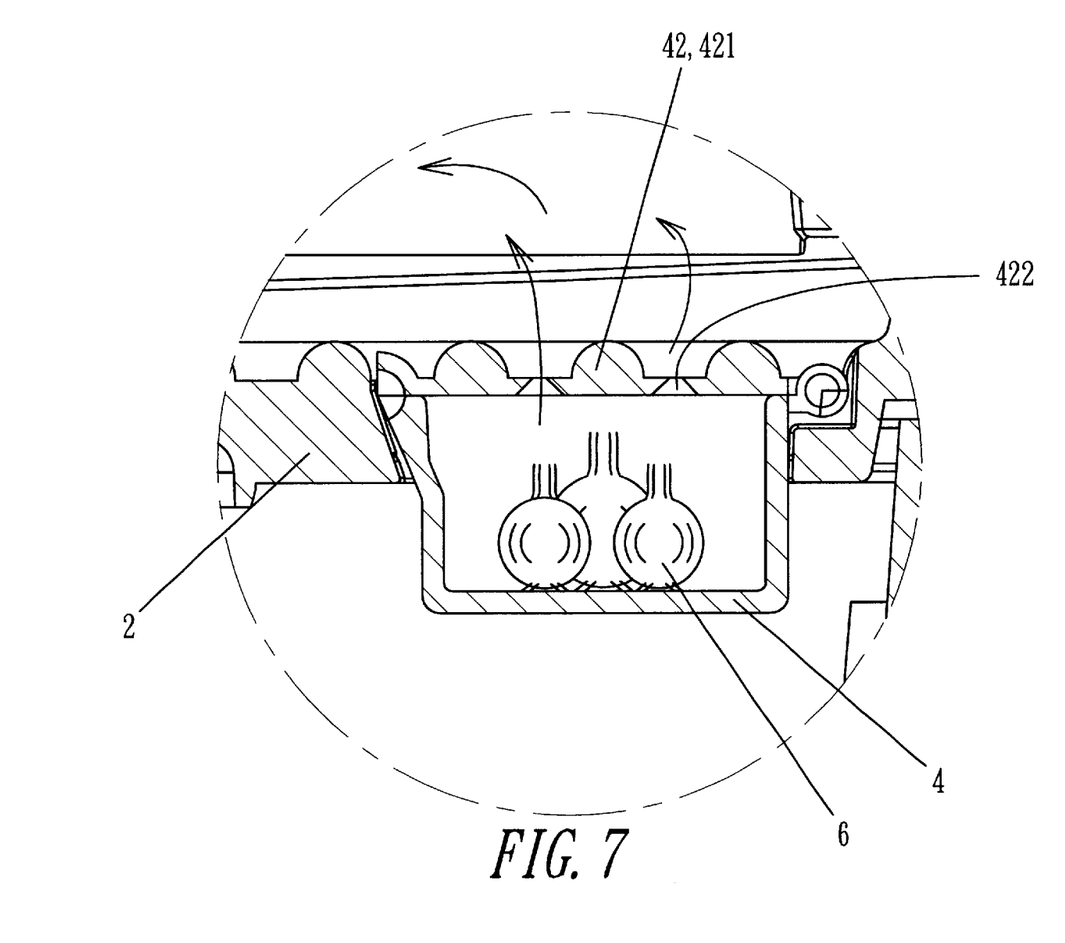
FIG. 7 is an enlarged view of the barbeque grill structure as shown in FIG. 6.

In assembly, referring to FIGS. 6 and 7 with reference to FIGS. 2–5, the material box 4 is initially secured in the opening 24 of the framework 2, with the support piece 41 being seated on the support step face 241. The locking bolt 5 then extends from the bottom of the support step face 241 through the screw hole 242 of the support step face 241, and through the screw hole 411 of the support piece 41 of the material box 4, thereby securing the material box 4 in the opening 24 of the framework 2. The protruding ribs 421 formed on the top cover 42 mate with the shape of the top the framework 2, thereby forming a complete framework 2.

A plurality of spice bottles 6 containing different kinds of spices are received and heated in the material box 4 until the fragrance of the spices in the spice bottles 6 is emitted and diffused outward through the air vents 422 of the top cover 42 into the closed chamber defined between the framework 2 and the top cap 3, and is then attached on the surface of the food 7 for seasoning the food 7 so as to increase the fragrance of the food 7.

Figure 8:
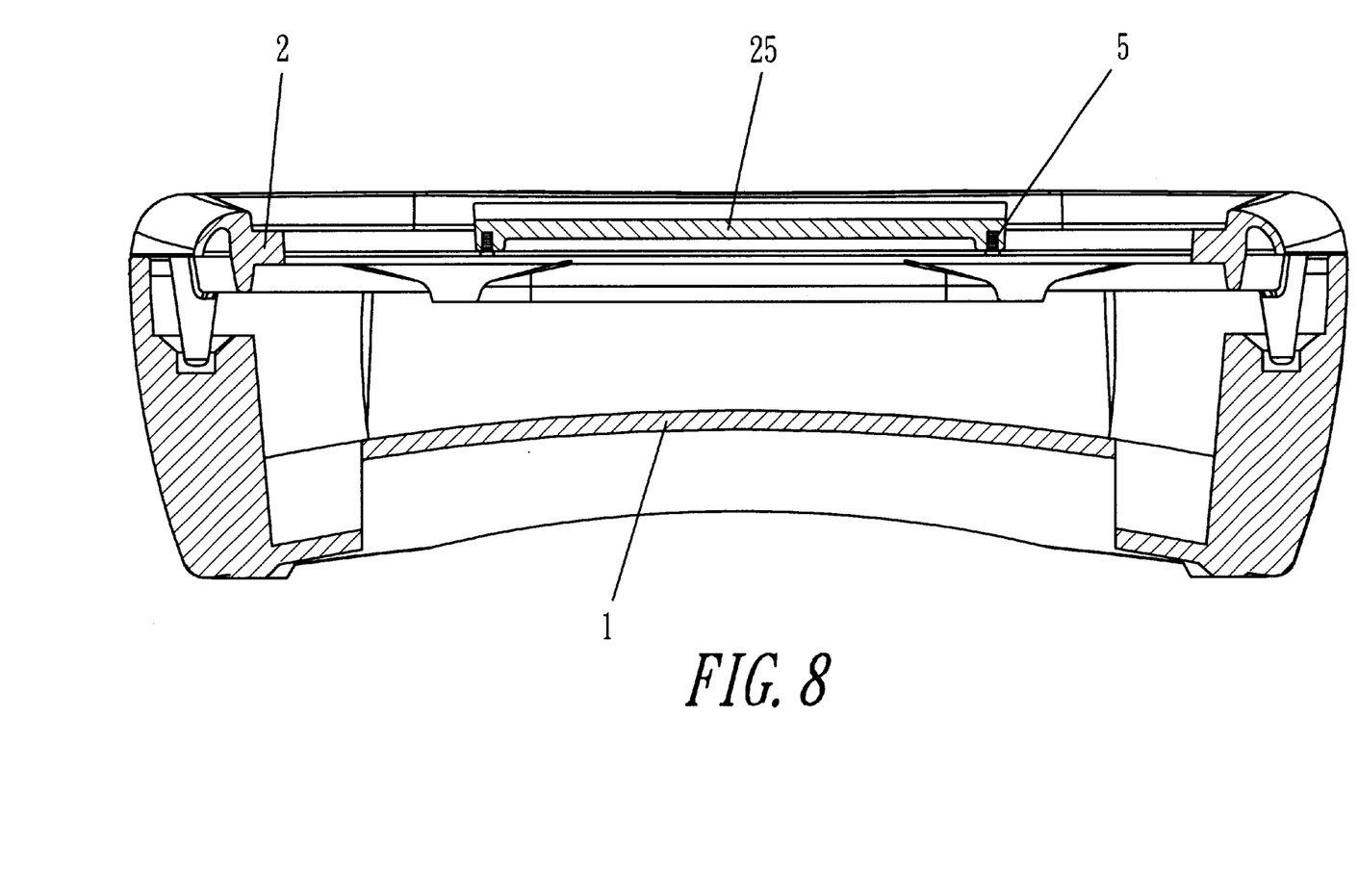
FIG. 8 is a side plan cross-sectional assembly view of the barbeque grill structure as shown in FIG. 2 in accordance with another embodiment of the present invention.
Figure 9:
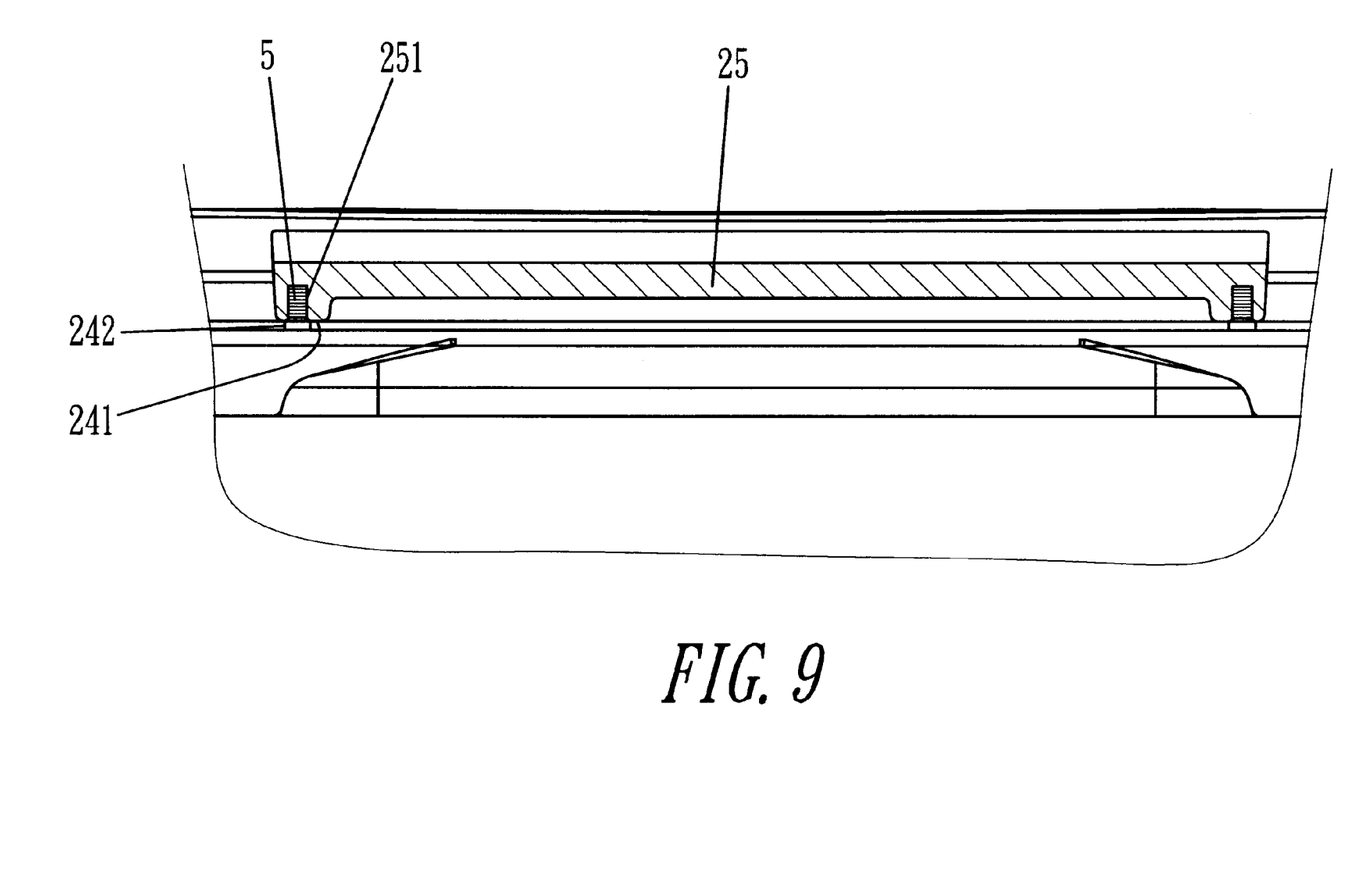
FIG. 9 is an enlarged view of the barbeque grill structure as shown in FIG. 4.

Alternatively, referring to FIGS. 8 and 9 with reference to FIG. 2, in accordance with another embodiment of the present invention, the material box 4 together with the top cover 42 can be removed from the opening 24 of the framework 2, and the insertion piece 25 can be received in the opening 24 of the framework 2.

The locking bolt 5 then extends from the bottom of the support step face 241 through the screw hole 242 of the support step face 241, and through the screw hole 251 of the insertion piece 25, thereby securing the insertion piece 25 in the opening 24 of the framework 2. The insertion piece 25 mates with the shape of the top the framework 2, thereby in turn forming a complete framework 2.

It should be clear to those skilled in the art that further embodiments may be made without departing from the scope of the present invention.

What is claimed is:

1. A barbeque grill structure comprising: a concave base (1), a grille-shaped framework (2), and a top cap (3), said framework (2) defining an opening (24) having two side walls each formed with a support step face (241), a material box (4) received in said opening (24) and having two sides each formed with a support piece (41) seated on said support step face (241), a top cover (42) removably mounted on said material box (4) and defining therein a plurality of air vents (422), whereby, a closed chamber is defined between said framework (2) and said top cap (3), and connects to said material box (4) through said air vents (422).

2. The barbeque grill structure in accordance with claim 1, further comprising an insertion piece (25) removably mounted in said opening (24) of said framework (2), whereby, when said material box (4) is removed from said opening (24), said insertion piece (25) is mounted in said opening (24), thereby forming a complete framework (2).

3. The barbeque grill structure in accordance with claim 1 or 2, wherein said support step face (241) of said opening (24) of said framework (2) defines a first screw hole (242), said support piece (41) of said material box (4) defines a second screw hole (411), and said insertion piece (25) has two sides each defining a third screw hole (251) so that said material box (4) or said insertion piece (25) can be locked in said opening (24).

4. The barbeque grill structure in accordance with claim 1, wherein each of said vent holes (422) has a tapered shape having a smaller top portion and a larger bottom portion.

* * * * *